June 30, 1970  S. H. BREWER  3,518,004
METHOD AND APPARATUS FOR DETERMINING THE ACCURACY OF THE
REFLECTING SURFACE OF A PARABOLOIDAL
REFLECTOR IN SPACE
Filed Feb. 13, 1968  3 Sheets-Sheet 1

PRIOR-ART

PRIOR-ART

INVENTOR.
SILAS H. BREWER
BY Harry A. Herbert Jr
Arsen Tashjian and
ATTORNEYS

INVENTOR.
SILAS H. BREWER
BY Harry A. Herbert Jr
Arsen Tashjian and
ATTORNEYS

United States Patent Office 3,518,004
Patented June 30, 1970

3,518,004
METHOD AND APPARATUS FOR DETERMINING THE ACCURACY OF THE REFLECTING SURFACE OF A PARABOLOIDAL REFLECTOR IN SPACE
Silas H. Brewer, Los Angeles, Calif., assignor to the United States of America as represented by the Secretary of the Air Force
Filed Feb. 13, 1968, Ser. No. 705,042
Int. Cl. G01b 9/00
U.S. Cl. 356—124                               6 Claims

ABSTRACT OF THE DISCLOSURE

The surface of a paraboloidal reflector-collector in space is tested for accuracy by a plurality of autocollimators affixed to a rotating arm which is structurally part of the reflector-collector energy conversion system in orbit. The reflector-collector is a paraboloid of revolution. Each of the autocollimators includes light emitting, light sensing, and other related associated components integrated into a single unit. The autocollimators are arranged with their optical axes along the respective normals to the reflector surface. The axis of rotation of the rotating arm is common with the optical axis of the paraboloidal segment. The autocollimators scan the surface of the reflector in azimuth. The deviation and reflectance of the reflector surface is ascertainable from the reflected radiation.

Background of the invention

This invention relates to a method and apparatus for determining the accuracy of the reflecting surface of a paraboloidal reflector in space.

More specifically, this invention relates to a method and apparatus for determining the accuracy of the reflecting surface of a paraboloidal reflector which, as a reflector-collector, is part of a solar-thermal energy conversion system that, at the time of testing, is in orbit.

The word "accuracy" is used herein to mean freedom from error or imperfection and, as applied to paraboloidal reflecting surfaces, is intended to mean the existence of, the location of, and the magnitude of the error or imperfection as to slope, displacement and reflectance of the reflector surface of a paraboloid of revolution.

In the past, the required degree of accuracy of metallic paraboloidal reflectors has been achieved by machining. However, the machining of large solid paraboloidal metal surfaces is difficult, at best. As a result, the state of the art progressed to paraboloidal reflectors of the sector, slat or petal type. The machining of the reduced surface, i.e., the sector or slat or petal, is still difficult, but is not as laborious as machining a solid paraboloidal surface. Nevertheless, machining may deform the surface of the slat, or the like, and as a result, testing for accuracy has been and is essential.

Where the paraboloidal surface is of mirrored glass, rather than metal, testing for accuracy of the surface is also necessary. While deformation of the surface is not a significant problem, the surfaces of paraboloidal glass mirrors are uneven after casting, especially if the "dropping" process is used. Even after grinding, polishing, parabolizing and silvering, testing is necessary.

Where the paraboloidal reflector is made of other material, such as rubber, or where the method of manufacture and/or erection is different, such as inflating mirrored rubber paraboloidal reflectors, other problems are present.

Therefore, despite all precautions, and irrespective of the method of manufacture, composition, or mode or erection of a paraboloidal reflector, testing for accuracy is necessary. For ground-based paraboloidal reflectors, this testing may be performed by templates, test plates, spherometers, mechanical scanning and optical scanning. The testing, although laborious, is relatively easy to perform, because the reflector is ground-based. If, however, the reflector is to be used in space, testing of the reflector in the actual space environment, in addition to testing on the ground, is absolutely necessary and is relatively more difficult to accomplish.

This invention, therefore, is primarily intended for testing paraboloidal reflectors in space, although the application of the invention is not, and is not intended to be, so limited. In fact, the method and the apparatus may be used while the paraboloidal reflector-collector is ground based.

SUMMARY OF THE INVENTION

This invention provides for a method and apparatus for determining the accuracy of the reflecting surface of a paraboloidal reflector-collector in space.

An object of the invention is to determine the presence of imperfections, if any, of the reflecting surface of the paraboloidal reflector-collector.

Still another object is to ascertain the location of the imperfections.

A further object is to ascertain the magnitude of the imperfections.

These, and still other objects of this invention, will become readily apparent after a consideration of the description of the invention and of the drawings.

DESCRIPTION OF THE METHOD AND EMBODIMENT

Background

Figure 1:
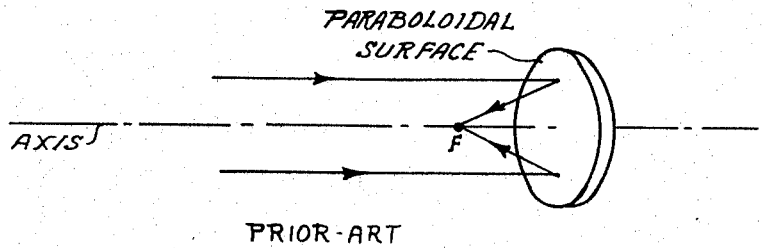
FIG. 1 is a simplified schematic representation of a ground-based method and apparatus used in the prior art for testing the accuracy of the reflecting surface of a paraboloidal reflector.

The conventional method of optically scanning a ground-based paraboloidal reflector is to impinge a collimated beam, propagated along a path parallel to the optical axis, onto the reflector surface and to monitor the imaging at the focus F, as shown in FIG. 1. The entire surface of the reflector is, or may be, examined by a systematic scan of the beam. This method allows a determination of the slope errors of the reflector surface, but only via the lateral shift of the image for a given reflector point. Nevertheless, the method has worked well, so long as the reflector is ground-based. However, it is obviously not well suited for the examination of a paraboloidal reflector-collector in space, because at least some components of the energy conversion system are located at the focus. As a result, the monitoring of imaging at the focus is precluded. Additionally, mechanical complications arise in attempting to resolve displacement, as well as slope errors of the paraboloidal reflecting surface.

Figure 2:
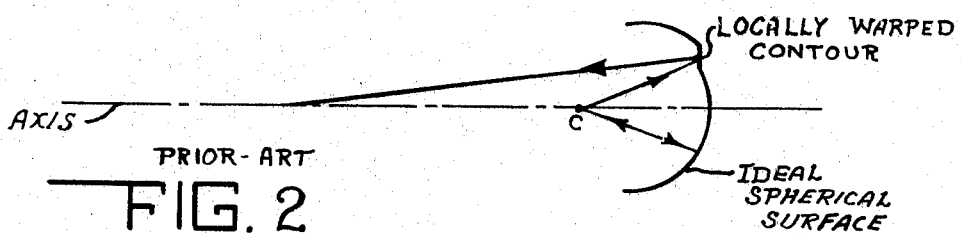
FIG. 2 is a simplified schematic representation of a ground-based method and apparatus used in the prior art for testing the accuracy of the reflecting surface of a spherical reflector.

An alternate method, referred to as "re-imaging," is to scan the surface of the ground-based paraboloid by originating the collimated beam from the focus and then monitoring the reflected ray for parallelism with the optical axis. An extension of this method is the optical scanning of the surface of a spherical reflector, as shown in FIG. 2. A beam emanating from a point source located at the center of curvature C of the spherical reflector is focused by the reflector surface, to form an image of the point source, at the center of curvature of the sphere. The reflected image would be coincident with the original point source if the spherical surface had no defect. Therefore, any departure from coincidence of the point source and the reflected image would be a function of the inaccuracy of the reflecting surface of the sphere.

Figure 3:
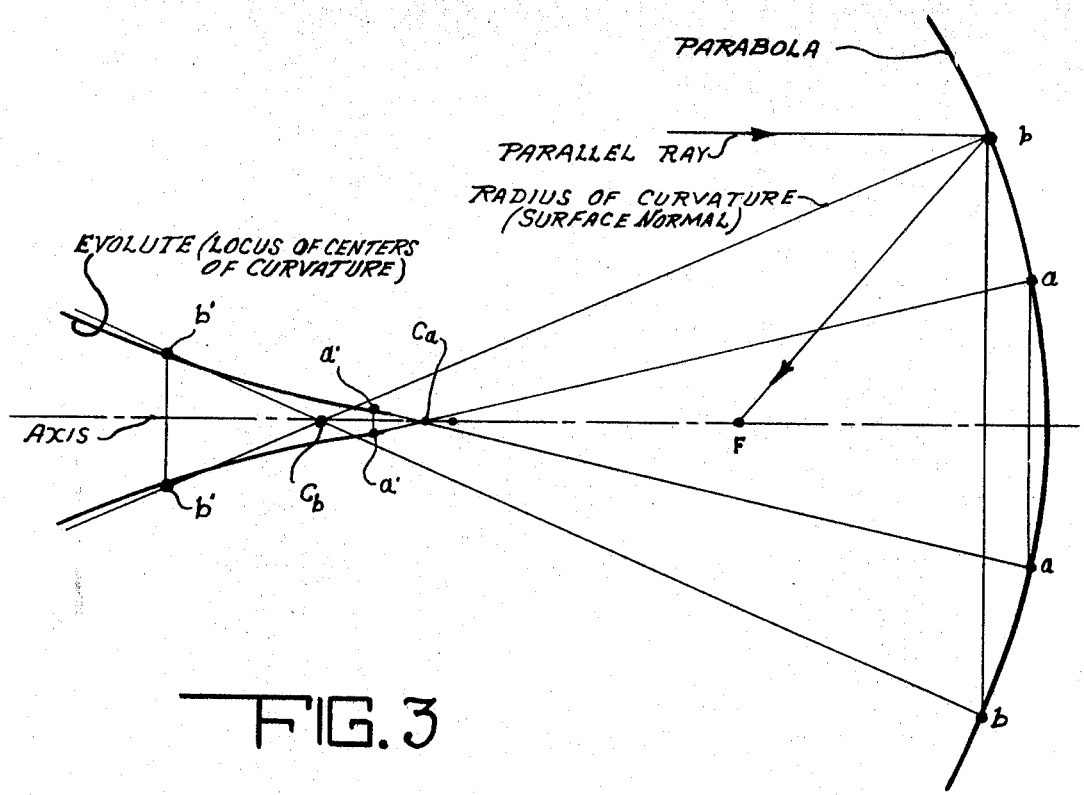
FIG. 3 is a schematic representation of the optical geometry pertinent to a reflector of the paraboloid of revolution type.

To adapt the reimaging method to a paraboloid of revolution, it must be recognized that no common center of curvature exists as with a sphere. Although the local normals to the surface tend to converge, the centers of curvature diverge continuously from the vertex outward. The paraboloid is a compound contour which has separate loci of centers of curvature for the plane curves projected onto each of two orthogonal planes containing the surface normal. With reference to FIG. 3, the curve in the plane containing both the normal and the axis is a parabola whose locus of centers of curvature is referred to as the evolute of the parabola. All of the radii of curvature, i.e., the local normals, at a given distance from the axis ($a$—$a$, $b$—$b$, etc.) intercept the axis at a common point ($C_a$, $C_b$, etc.) which can be easily determined from the known, or ideal, geometry of the paraboloid. The centers of curvature ($a'$—$a'$, $b'$—$b'$, etc.) diverge outward on the evolute. The curve in the orthogonal plane has a different evolute, but a common surface normal and, hence, all of its radii of curvature for the same radial zone of the surface intersect the axis at the same point. This convergence property of the surface normals is behind the simplifying assumption commonly employed in geometrical ray tracing practice; namely, that the local curvature of the paraboloid may be represented by a coaxial sphere having a common surface normal and a center of curvature located at $C_a$, FIG. 3.

Embodiment

To test the surface of a paraboloid of revolution in the same manner as described for a sphere, a point image light source could be moved continuously along the optical axis of the paraboloid to scan the surface in elevation and azimuth. However, in the usual orbital test situation, the configuration of the energy conversion system precludes free transit of the point image light source, because a major portion of the energy conversion system is, of necessity, located at, or very nearly at, the focus of the paraboloid reflector. As a result, the locus of the centers of curvature of the reflector is blocked. Hence, the optical scanning instrument must be located elsewhere along the radii of curvature. My solution is to place a plurality of such scanning instruments at a locus equidistant from the centers of curvature in an array, on a member capable of being rotated about the optical axis of the reflector, on a ring mounted aft of the focus and, structurally, a part of the energy conversion system. Since the locus equidistant from the centers of curvature is beyond the focus, a circumferential traverse at multiple radial positions in as many azimuthal steps as may be desired can be made. More specifically, and with reference to FIG. 4, the paraboloidal reflector-collector and associated components of the energy conversion system are shown in space after launch. The paraboloidal reflector-collector is, structurally, at one end of the system. The reflector-collector is of the petaline type with petals, such as 11, and reflecting surface thereof, such as 12. At the other end of the structure is rotary ring mount 14 with radial support arm 15 to which, in turn, are affixed five autocollimators, such as 16. Each autocollimator is axially aligned with the local radii of curvature 18; is on a locus of equidistant points from the centers of curvature; and, assuming, for example, a paraboloidal reflector-collector having the following characteristics diameter—approximately 45 feet
focal length—approximately 19.5 feet
"rim" angle—approximately 60°

Then, the autocollimators are fixed, respectively, at 6°, 12°, 18°, 24°, and 30° with the optical axis.

It is to be noted that calorimeter 17 is at the focus.

The autocollimator includes light emitting, light sensing, and other related associated components integrated into a single unit. Specifically, and with reference to FIG. 5, the optical members include objective lens 24 at one end; field lens 26 at the other end; beam splitter 23 interposed between them; and reticle 25 disposed between beam splitter 23 and field lens 26. The objective lens 24, field lens 26, and the center of reticle 25 are on a common optical axis. Beam splitter 23 is at approximately 45° to that common axis. A point source lamp 21, with aperture 22, is located so that the collimated beam impinges upon beam splitter 23 at about 45°. Light source sensor 28, preferably of the photocell type, is located directly in line with the collimated beam of light and is so positioned as to receive that portion of the beam transmitted through beam splitter 23. Image sensor 27, i.e., a reflected beam sensor, preferably of the photocell type, is behind field lens 26 and in line with the optical axis of field lens 26. The output lead from light sensor 28 and the output lead from image sensor 27 are fed into the signal processor 29.

Figure 5:
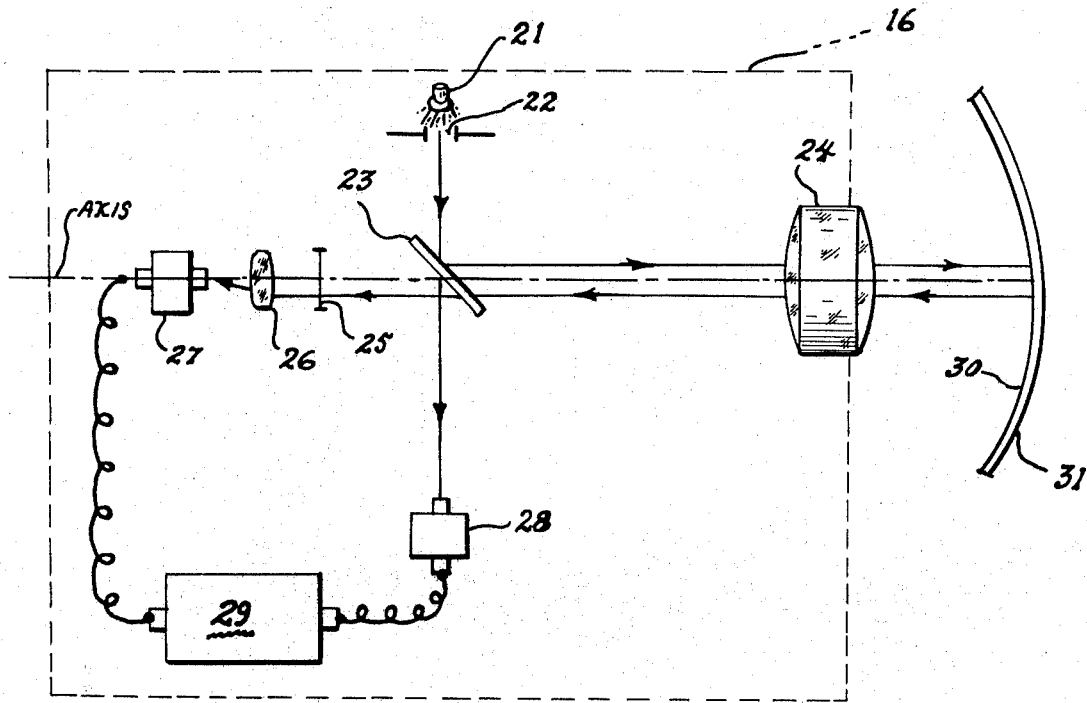
FIG. 5 is a schematic representation of the autocollimator used in the embodiment shown in FIG. 4.
Figure 6:
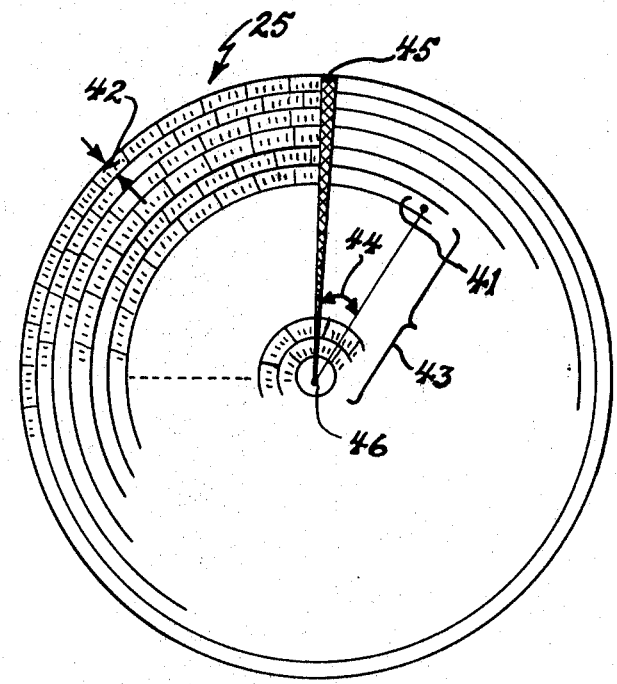
FIG. 6 is a schematic representation of the reticle member of the autocollimator shown in FIG. 5.

With reference to FIG. 6, reticle 25 is a transparent disc rotated, by conventional means, at a constant angular velocity about an axis coincident with the optical axis of objective lens 24 and field lens 26, FIG. 5. There are a number of annular regions, such as 41, all of which are of equal radial increment 42. The center of the disc is 46 and the radial fiducial marker is 45.

MODE OF OPERATION OF THE EMBODIMENT

Figure 4:
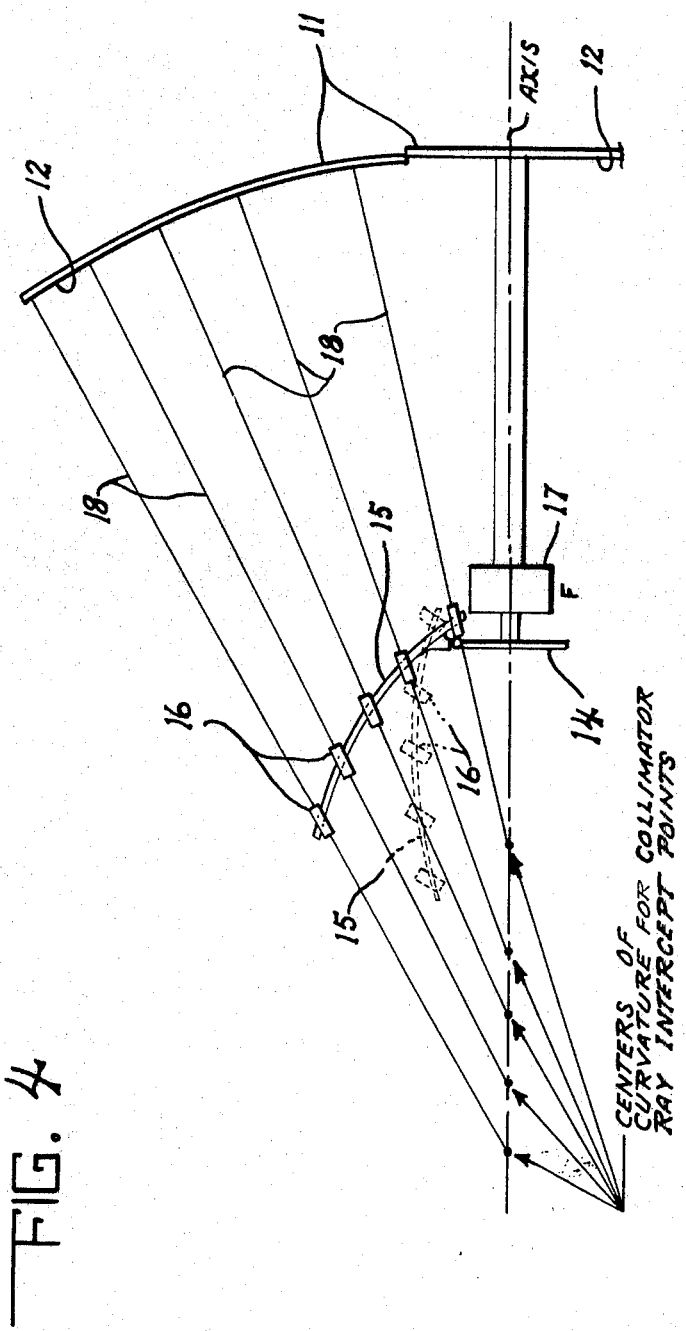
FIG. 4 is a schematic representation of a preferred embodiment of the invention.

The energy conversion system shown in FIG. 4 is launched by conventional means, such as an Agena "D" vehicle, and is deployed. During deployment, radial support arm 15, together with autocollimators 16, is raised to the preselected operating position by the use of an expansion spring member or other suitable means, and then is locked in place, on rotary ring mount 14, by a snap-and-detent mechanism (not shown) or other suitable means. With the system in orbit, it is then desired to test the accuracy of the reflecting surface of the paraboloidal reflector-collector.

With reference to FIG. 5, point light source 21 projects a collimated beam through aperture 22 onto beam splitter 23. The reflected part of the source beam is directed along the optical axis of objective lens 24 to parabolodal reflecting surface 30. At the same time, the transmitted part of the beam passes through beam splitter 23 onto source sensor 28 which has been calibrated to measure source energy. The source ray is reflected by reflecting surface 30 back along the autocollimator optical axis through objective lens 24 and beam splitter 23, falling on rotating reticle 25 and through to field lens 26 and image sensor 27.

The reflectance of paraboloidal reflector-collector 31 is directly monitored with each ray measurement by using signal processor 29 to compare the output magnitudes of source sensor 28 and image sensor 27. If the outputs match, there has been no loss of reflectance.

With reference to FIG. 6, transparent reticle 25 is rotated at a constant angular velocity, by conventional means, about an axis coincident with the optical axis of objective lens 24, field lens 26, and image sensor 27, all of FIG. 5. The annular regions, such as 41, FIG. 6, of reticle 25, are of equal radial increment 42 and are optically coded, by conventional means, so that as the reflected light point image falls in a given annular region 41, the data is fed by image sensor 27 to signal processor 29, FIG. 5, with the result that ray intercept 43 and angular deviation 44 from fiducial marker 45 are determined.

It is to be noted that, if the reflected light point image falls at center 46 of reticle 25, it is an "error-free" situation, and no signal is produced to be fed into the signal processor 29, FIG. 5. Further, it is obvious that angular deviation 44 is related to the direction of deviation of the particular surface normal.

Therefore, the magnitude of the slope error at the reflecting surface of the paraboloidal reflector-collector is determined directly as a function of the excursion of the light point image away from center 46 of reticle 25, and the directional deviation of the surface normal is determined directly as a function of the angular deviation 44 from fiducial marker 45.

While there has been shown and described the fundamental novel features of the invention, as applied to the preferred embodiment, it is understood that various substitutions and omissions may be made by those skilled in the art without departing from the spirit of the invention. For example: The number of autocollimators could be increased or decreased; and, in particular situations, a single autocollimator, instead of a plurality, could be used effectively, if moved sequentially to the center of curvature of preselected zones.

I claim:

1. The method of accurately determining the existence, location and magnitude of imperfections of the reflections of the reflecting surface of a paraboloidal reflector-collector in space, comprising the steps of:
    (a) scanning, in azimuth, discrete zones of the reflecting surface of said paraboloidal reflector-collector with a plurality of autocollimators, located along the radii of curvature of said paraboloidal reflector-collector at a locus equidistant from the centers of curvature of said paraboloidal reflector-collector, with said autocollimators individually emitting a collimated beam of light;
    (b) measuring the magnitude of the light source of each said collimated beam;
    (c) monitoring each beam of light reflected from the reflecting surface of said paraboloidal reflector-collector as a result of impingent thereon of said individual collimated beam of light;
    (d) measuring the angular deviation and lateral displacement of each said reflected beam;
    (e) measuring the magnitude of reflectance of each said reflected beam;
    (f) and comparing the magnitude of reflectance of each said reflected beam with the magnitude of the corresponding emitting light source.

2. An apparatus for accurately determining the existence, location and magnitude of imperfections of the re-reflecting surface of a paraboloidal reflector-collector in space comprising:
    (a) a paraboloidal reflector-collector having an energy absorbing component located at the focus of said reflector-collector;
    (b) a ring mount rotatable about, anad perpendicular to, the optical axis of said reflector-collector and positioned at a locus equidistant from the centers of curvature of said reflector-collector;
    (c) means for rotating said rotatable ring mount;
    (d) a radial support arm pivotally connected to said ring mount;
    (e) means for locking said radial support arm in a preselected position;
    (f) and at least one autocollimator means affixed to said radial support arm and angularly positioned thereon along a radius of curvature of said reflector-collector, such that collimated light from said autocollimator means impinges upon the reflecting surface of said reflector-collector.

3. An apparatus, as set forth in claim 2, wherein said paraboloidal reflector-collector is of the petaline type.

4. An apparatus, as set forth in claim 2, wherein said radial support arm is initially positioned substantially parallel to the optical axis of said paraboloidal reflector-collector and is raised to a preselected position during the scanning procedure.

5. An apparatus, as set forth in claim 2, wherein said autocollimator means includes a plurality of autocollimators spaced along said radial support arm at preselected positions.

6. An apparatus, as set forth in claim 2, wherein said autocollimator means includes:
    (a) a housing impervious to light for containing said collimating means;
    (b) means for emitting a collimated beam;
    (c) means for measuring magnitude of reflectance of said reflected collimated beam;
    (d) means for sensing angular deviation and lateral displacement of said reflected collimated beam;
    (e) means for measuring magnitude of light source of said collimated beam;
    (f) and means for comparing magnitude of reflected beam and magnitude of light source.

References Cited

UNITED STATES PATENTS 2,052,591  9/1936  Williams _____ 356—153

ROY LAKE, Primary Examiner

C. CLARK, Assistant Examiner